(12) United States Patent
Riess et al.

(10) Patent No.: US 9,597,626 B2
(45) Date of Patent: Mar. 21, 2017

(54) USE OF CLINKER KILN DUST FOR GAS SCRUBBING

(71) Applicant: CalPortland Company, Glendora, CA (US)

(72) Inventors: Hartmut Riess, La Verne, CA (US); Dusting Pham, Baldwin Park, CA (US); George Hartman, Rancho Cucamonga, CA (US); Zuhair Hasan, Corona, CA (US)

(73) Assignee: CalPortland Company, Glendora, CA (US)

( * ) Notice: Subject to any disclaimer, the term of this patent is extended or adjusted under 35 U.S.C. 154(b) by 0 days.

(21) Appl. No.: 15/229,990

(22) Filed: Aug. 5, 2016

(65) Prior Publication Data

US 2017/0036157 A1 Feb. 9, 2017

Related U.S. Application Data

(60) Provisional application No. 62/201,971, filed on Aug. 6, 2015.

(51) Int. Cl.
*B01D 47/00* (2006.01)
*C04B 7/36* (2006.01)
*C04B 7/44* (2006.01)

(52) U.S. Cl.
CPC .............. *B01D 47/00* (2013.01); *C04B 7/364* (2013.01); *C04B 7/44* (2013.01)

(58) Field of Classification Search
None
See application file for complete search history.

(56) References Cited

U.S. PATENT DOCUMENTS 3,206,526 A * 9/1965 Rygaard ................... F27B 7/20
432/108
4,915,914 A 4/1990 Morrison et al.
(Continued)

FOREIGN PATENT DOCUMENTS

AT 390249 B 4/1990
DE 19511304 A1 10/1996
(Continued)

OTHER PUBLICATIONS

International Search Report and Written Opinion for Application No. PCT/US2016/045836, mailed on Oct. 17, 2016, 13 pages.
(Continued)

*Primary Examiner* — Duane Smith
*Assistant Examiner* — Phillip Shao

(57) ABSTRACT

Methods and apparatus for reducing the content of controlled acidic pollutants in clinker kiln emissions are disclosed. The methods and apparatus include introducing bypass dust produced during production of clinker into one or more locations between the preheater exhaust and the inlet to a dust filter including into a gas conditioning tower. Total bypass dust separated from the kiln exhaust gas may be used. The bypass dust can be separated into a fine and coarse portions. Fine or total bypass dust can be mixed with water to form a bypass dust slurry that can be introduced into the gas conditioning tower. Bypass dust can be used to reduce the content of acidic pollutants such as hydrogen chloride HCl and sulfur oxides $SO_x$ from clinker kiln emissions.

14 Claims, 11 Drawing Sheets

(56) References Cited

U.S. PATENT DOCUMENTS

| | | | | |
|---|---|---|---|---|
| 6,331,207 B1* | 12/2001 | Gebhardt | ................ | C04B 7/436 106/751 |
| 6,416,574 B1* | 7/2002 | Steelhammer | .......... | C04B 7/428 106/745 |
| 2010/0300864 A1* | 12/2010 | Jepsen | ................... | B01D 53/10 201/1 |
| 2010/0316546 A1* | 12/2010 | Paone, III | .............. | B01D 53/64 423/215.5 |
| 2014/0134089 A1* | 5/2014 | Archetti | ................ | B01D 53/56 423/239.1 |

FOREIGN PATENT DOCUMENTS

| | | |
|---|---|---|
| FR | 2557811 A1 | 7/1985 |
| WO | 93/10884 A1 | 6/1993 |
| WO | 2008/074048 A1 | 6/2008 |

OTHER PUBLICATIONS

Tribe Passamaquoddy: "Project Performance Summary Clean Coal Technology Demonstration Program Cement Kiln Flue Gas Recovery Scrubber™", Jun. 1999, 16 pages. Retrieved at URL: https://www.netl.doe.gov/File%20Library/Research/Coal/major%20demonstrations/cctdp/Round2/PASSAMAQ.pdf.

* cited by examiner

USE OF CLINKER KILN DUST FOR GAS SCRUBBING

This application claims the benefit under 35 U.S.C. §119 (e) of U.S. Provisional Application No. 62/201,971, filed on Aug. 6, 2015, which is incorporated by reference in its entirety.

FIELD

Methods and apparatus for reducing the content of controlled acidic pollutants in clinker kiln emissions are disclosed. The methods and apparatus include introducing bypass dust generated during production of clinker into one or more locations between the preheater exhaust and the inlet to a dust filter including into a gas conditioning tower. The total bypass dust can be used or the bypass dust can be separated into fine and coarse portions. Fine or total bypass dust can be mixed with water to form a bypass dust slurry that can be introduced into the gas conditioning tower. Bypass dust can be used to reduce the content of acidic pollutants such as hydrogen chloride HCl and sulfur oxides $SO_x$ in clinker kiln emissions.

BACKGROUND

Reducing the atmospheric emission of controlled pollutants is a continuing societal concern. In the United States primary regulatory authority over industrial source air emissions resides with the U.S. Environmental Protection Agency (EPA). Over the years, the EPA has increased the stringency of air pollution control programs, both by decreasing the limits on acceptable emissions and by continually increasing the number and types of regulated pollutants.

As a source of controlled pollutant emissions, clinker kilns are subject to EPA emission regulations. Gaseous exhaust from a clinker kiln contains particulates and various gases. The particulates can be removed from the exhaust stream using a particle or dust separator such as an electrostatic precipitator (ESP) and/or a fabric filter baghouse (FFB) collector. The filtered exhaust gases can contain acidic controlled pollutants such as hydrogen chloride HCl and sulfur oxides $SO_x$ that must be reduced to meet regulatory requirements. In general, it is desirable that the concentration of hydrogen chloride HCl in clinker kiln emissions be less than 3 ppm (dry basis with 7% $O_2$) and the permitted concentration of sulfur oxides $SO_x$ is set for each plant.

A wet chemical scrubber can be included after a dust filter; however, conventional methods to scrub acid forming gases such as hydrogen chloride HCl and sulfur oxides $SO_x$ can be expensive and inconsistent with the economic operation of an energy-efficient clinker kiln. For example, conventional wet scrubbers, which commonly use spray droplet sizes greater than 1000 microns, typically use 10 gal/min to 100 gal/min of liquid to scrub 1000 standard cubic feet per minute of effluent gases (1-10 kilograms of liquid per kilogram of gas). As a result, the consumption of water, scrubbing chemicals, and energy using conventional wet scrubbers is high.

Hot clinker kiln exhaust gases must be cooled to approximately 150° C. to have acceptable particulate emissions from an ESP or cooled to approximately 180° C. to protect a FFB from overheating. To cool and condition hot kiln exhaust gases, before entering an ESP or FFB a spray of water can be used to cool and condition the exhaust gases in a gas conditioning tower (GCT). Further cooling and conditioning may then be performed by passing the conditioned exhaust gases through cool wet limestone of a raw mill used to grind the raw materials into a kiln feed, which can then be transported to a pyroprocessing kiln. A GCT can also be used in parallel with the raw grinding transport if the moisture content of the raw material is high; however, a GCT is generally used in an upstream process when the moisture content of the raw material is low.

An approach to reduce hydrogen chloride HCl and sulfur oxide $SO_x$ emissions from a clinker kiln is to inject a high-pH lime slurry into the spray used in a gas conditioning tower (GCT). To prepare the lime slurry, lime can be reacted with water to form calcium hydrate $Ca(OH)_2$ (hydrated lime). Hydrated lime $Ca(OH)_2$ can be introduced into a GCT in dry form containing, for example, up to about 2 wt % water, or can be in the form of a wet slurry having a hydrated lime solids content, for example, up to about 50 wt % and introduced into the GCT as a spray of droplets. The lime CaO used to form the slurry is typically purchased from a supplier and transported to the clinker kiln, which increases the cost of reducing emission of controlled pollutants. The lime is typically produced to be highly reactive with acid gases, which can be determined by a number of factors such as the pore volume, the specific surface area, low water content, and low agglomeration. Alternatively, hydrated lime, which is stable and easier to handle, can be prepared remotely and transported to the clinker kiln. $Ca(OH)_2$ in the lime slurry adsorbs and reacts with sulfur oxides $SO_x$ and other acid forming gases such as hydrogen chloride HCl to produce thermally stable salts, which can be filtered from the effluent gases and thereby reduce emissions of the acid forming species in the exhaust gases.

It is desirable to find alternative ways to reduce controlled acidic pollutants in clinker kiln emissions to meet the continuously evolving environmental standards.

SUMMARY

Methods for reducing the concentration of controlled acidic pollutants in clinker kiln emissions are disclosed, comprising providing a clinker kiln, wherein the clinker kiln comprises a gas conditioning system configured to process exhaust gases from the clinker kiln; and introducing bypass dust generated during operation of the clinker kiln at one or more locations in the gas conditioning system, to reduce the concentration of controlled pollutants in the clinker kiln emissions.

According to the present invention, methods for reducing the concentration of controlled pollutants in clinker kiln emissions provided by the present disclosure comprise providing a clinker kiln, wherein the clinker kiln comprises a gas conditioning system configured to process exhaust gases from the clinker kiln; and introducing bypass dust generated during operation of the clinker kiln at one or more locations in the gas conditioning system, to reduce the concentration of controlled pollutants in the clinker kiln emissions.

According to the present invention, a clinker plant provided by the present disclosure comprises a gas conditioning system comprising a preheater exit, a gas conditioning tower, and a main baghouse; one or more separators for separating dust generated during the production of clinker into one or more fractions; and introducing at least one of the one or more dust fractions into the gas conditioning system at one or more locations between the preheater exit and the main baghouse.

According to the present invention, methods for reducing the concentration of controlled pollutants in clinker kiln emissions, comprise providing a clinker kiln, wherein the clinker kiln comprises a gas conditioning system configured to process exhaust gases from the clinker kiln; and introducing dust generated during operation of the clinker kiln at one or more locations in the gas conditioning system, to reduce the concentration of controlled pollutants in the clinker kiln emissions.

According to the present invention, a clinker plant comprises a gas conditioning system comprising a preheater exit, a gas conditioning tower, and a main baghouse; a separator for separating dust from exhaust gases; and a nozzle for introducing the separated dust in proximity to the preheater exhaust exit, into the gas conditioning tower, in proximity to the inlet to the dust collector, or a combination of any of the foregoing.

BRIEF DESCRIPTION OF THE DRAWINGS

The drawings described herein are for illustration purposes only. The drawings are not intended to limit the scope of the present disclosure.

Reference is now made in detail to embodiments of the present disclosure. While certain embodiments of the present disclosure are described, it will be understood that it is not intended to limit the embodiments of the present disclosure to the disclosed embodiments. To the contrary, reference to embodiments of the present disclosure is intended to cover alternatives, modifications, and equivalents as may be included within the spirit and scope of the embodiments of the present disclosure as defined by the appended claims.

DETAILED DESCRIPTION

Methods and apparatus for reducing emissions of controlled pollutants from clinker kilns are disclosed. Dust having a high free lime CaO content generated during clinker production is fed into the kiln exhaust between the preheater exit and the main vent baghouse inlet to reduce the concentration of controlled acidic pollutants such as hydrogen chloride HCl and sulfur oxides $SO_x$ in the kiln emissions.

Figure 1:
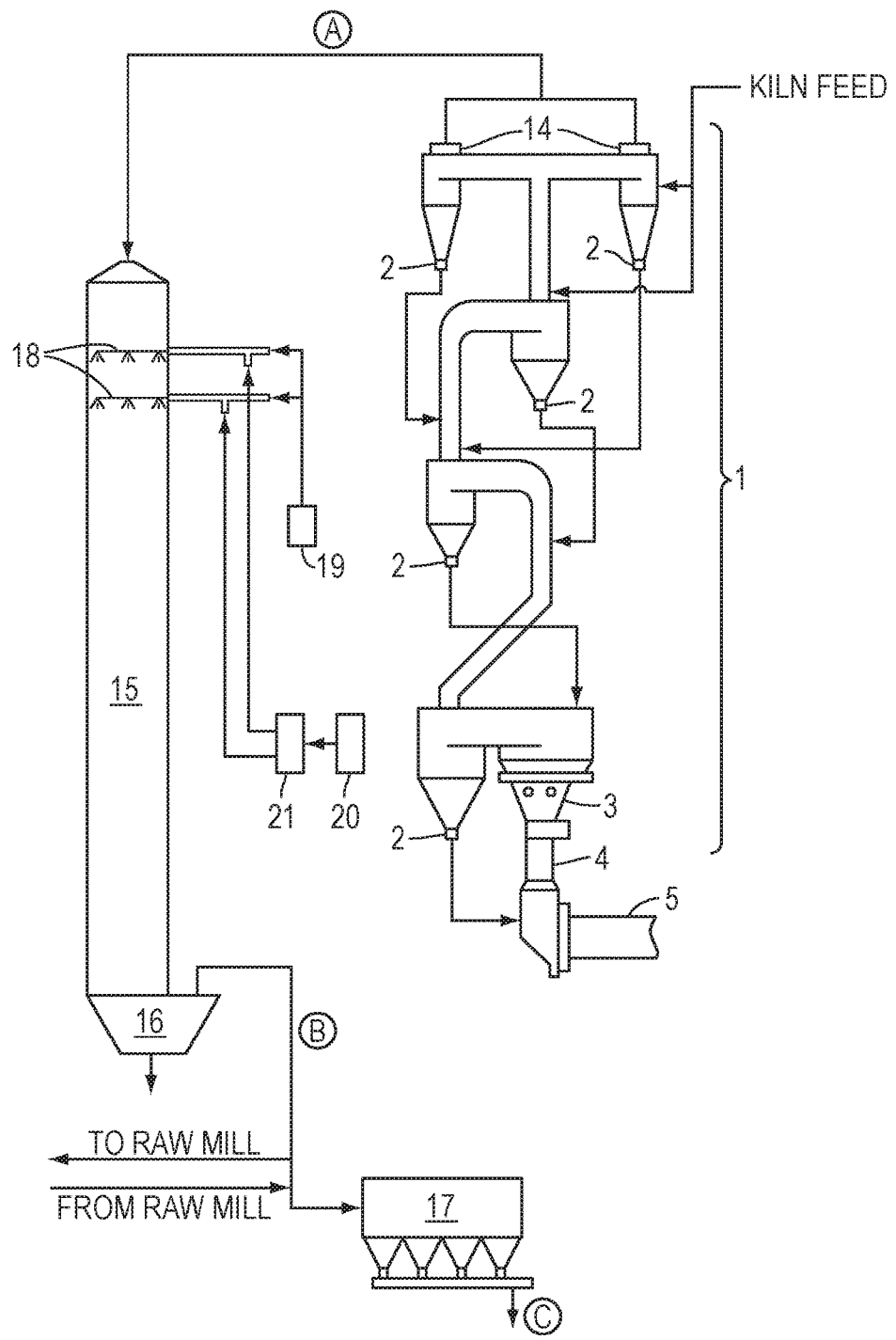
FIG. 1 is a schematic diagram showing certain components of a prior art clinker kiln.

Certain aspects of a clinker kiln are shown in FIG. 1. A primary kiln feed material comprising a calcium-containing mineral used in manufacturing clinker is obtained from a quarry. The primary feed material is limestone, to which smaller quantities of sand, clay, shale, iron ore, bauxite and/or other materials which provide the calcium, silica, aluminum and iron necessary to produce clinker can be added. The quarried material is reduced in size by a crusher (not shown), and the crushed raw material is then transported to the raw grinding area of the clinker kiln system. Suitable proportions of the raw materials are then mixed and further reduced in size in a raw mill to form a kiln feed.

In operation, a raw mill continuously classifies the kiln feed being processed using separation techniques such as cyclones, swirl cage classifiers, or other third and fourth generation classifiers. Large diameter particles can be retained for further grinding and smaller, properly sized particles can be sent on for further processing. Very fine dust particles become entrained in the gas flow and can be removed by a dust filter such as an ESP or FFB.

The kiln feed from the raw mill is transported to and preheated using exhaust gas from the kiln in a preheating tower 1, comprising a series of vertically stacked cyclone chambers 2 and a precalciner 3. As shown in FIG. 1, kiln feed enters at the top of the preheating tower 1 and is preheated as it descends through the preheating tower 1 under the force of gravity. The heated kiln feed is then introduced into a precalciner 3, which converts the calcium carbonate ($CaCO_3$) in the limestone (or other feed material) into calcium oxide (CaO, also referred to as free lime), releasing a large amount of carbon dioxide ($CO_2$) in the process. During precalcination the kiln feed is heated to a high temperature between about 800° C. and 900° C. and the gas temperature can be from about 900° C. to about 1,000° C. The energy required for precalcination is higher than the energy content of the kiln exhaust gases, and therefore additional heat is generated in the precalciner.

After precalcination, the precalcined kiln feed is introduced into a rotary pyroprocessing kiln, such as rotary kiln 5 where the kiln feed is heated to a temperature of about 1,500° C. to form clinker, consisting primarily of calcium silicates. The kiln feed is introduced through a separate line and gases carrying dust leave the kiln through kiln exit riser duct 4. Rotary kiln 5 is substantially horizontal, with a slight tilt sufficient for gravity-assisted transport of the materials undergoing pyroprocessing along its length. The hot clinker is then discharged from the rotary kiln into a cooling chamber (not shown). After being cooled, the clinker is discharged from the cooling chamber and interground with gypsum and other mineral additives to produce cement.

Clinker kilns are designed for maximum efficiency to make optimal use of thermal energy. Gases are routed through the plant so as to use and recapture as much of the heat as possible. Accordingly, the physical layout of a clinker kiln is optimized to minimize heat losses as the materials travel between the various processing stations in the system. For example, exhaust gases from rotary kiln 5 are used to preheat and dry the kiln feed before pyroprocessing in preheating tower 1. As evident in FIG. 1, the gas flow through the plant is generally counter to the flow of the solids and, from the time the gases leave the kiln to the time they are exhausted into the atmosphere, the gases exchange heat with the kiln feed, i.e., the gases are cooled as the kiln feed is dried and heated. Thus, for example, the kiln feed is progressively heated as it travels down the preheating tower 1 from one preheating cyclone 2 to the next, while the flue gases become successively cooler as they travel up the preheating tower.

The air used for combustion in rotary kiln 5 first flows through a cooling chamber (not shown), where the air heats as it cools the clinker. The hot exhaust gases from kiln 5 flow through the precalciner 3 and through the preheating tower 1. After combustion in the kiln very little oxygen remains in the exhaust gas flow, and so additional air is introduced into precalciner 3 to support combustion. After passing through preheating tower 1, the temperature of the exhaust gases A is reduced by routing through GCT 15 that can include water 19 sprayed from nozzles 18. The exhaust gases containing entrained dust and volatile gases B are then filtered using a baghouse 17 or an electrostatic precipitator. The filtered dust is typically recycled back into and blended with the kiln feed.

FIG. 1 also shows a pollution control system comprising, for example, a hydrated lime $Ca(OH)_2$ slurry source 21 and a controllable slurry injector 20 to add a controlled quantity of the hydrated lime slurry to the liquid sprayed from nozzles 18. The slurry source 21 can comprise alkaline earth materials, such as hydrated lime, having a small particle size. Commercially available sources of fine, dry hydrated lime may be produced by a variety of methods. Fine, dry particles of hydrated lime can have particle sizes on the order of 10 microns and, therefore can have a relatively large surface area to facilitate surface chemical reactions. However, commercially available sources of dry particles of chemically active hydrated lime can be comparatively expensive. Use of fine, dry hydrated lime particles also presents an added difficulty because dry hydrated lime must be stored in an inert environment until use because of its high chemical reactivity. Specifically, atmospheric carbon dioxide readily reacts with hydrated lime to form calcium carbonate, according to the expression: $Ca(OH)_2 + CO_2 \rightarrow CaCO_3 (S) + H_2O$ (1). Compared to hydrated lime, calcium carbonate is comparatively unreactive with pollutants such as acid-forming gases.

The hydrated lime slurry can be prepared on-site substantially as needed using an in-line grinder to ensure the highest chemical reactivity of the ground hydrated lime particles in the slurry. If the slurry is not immediately used, it may be maintained in an inert ambient environment, such as a sealed or nitrogen purged storage tank. If the slurry is stored in an inert ambient environment, it may be stored for relatively short periods (e.g., less than 24 hours) without substantially decreasing its chemical reactivity. Alternatively, the hydrated lime slurry may be transported to the site and mixed with water prior to use.

The spray from the nozzles 18 may be adjusted to achieve a desired cooling, for example, reducing the gas temperature from about 400° C. to 150° C. for ESP scrubbing or to about 180° C. for FFB scrubbing. The total quantity of spray can be as low as possible and the evaporative lifetime of the spray droplets can be short. The droplet size can be adjusted such that the droplets completely evaporate just before exiting the GCT. The mean lifetime of the spray droplets can be, for example, slightly less than the transit time of gases through the GCT. For example, the spray can be adjusted such that the largest spray droplets have a diameter from about 120 microns to about 150 microns. The evaporative lifetime of a spray droplet can be within a range from about 2 seconds to about 5 seconds. This is a relatively short time period for acidic gases to adsorb on to the surface of a droplet, be absorbed into the droplet, and react with calcium hydroxide released from the slurry particles in the droplet. For the reaction to be rapid and efficient, it can be desirable that the hydrated lime particles suspended in the spray droplets substantially dissolve during the transit time of the droplet.

For the spray to efficiently scrub the kiln exhaust the individual droplets should rapidly absorb pollutant gases and hydrated lime particles contained by the droplets should rapidly react with the acidic pollutant gases before the droplets evaporate within the GCT. Additionally, chemical scrubbing agents and reacted products should otherwise be compatible with the economic operation of the clinker kiln. It is desirable that the cost of the chemical scrubbing agent should be low and the chemical scrubbing agent and reacted products not damage or clog pipes, valves, or fittings in the clinker kiln. It is also desirable that any scrubbing chemical used not contaminate the kiln feed or adversely alter the chemical balance of the kiln feed.

Flow of water or hydrated lime slurry to the nozzles 18 can be adjusted to provide efficient scrubbing. The nozzles facilitate efficient scrubbing by providing droplets characterized by a large initial surface-to-volume ratio, such that the adsorption of gases is rapid; provide uniform chemical reaction dynamics by maintaining a substantially similar initial droplet diameter among the droplets and hence substantially the same quantity of slurry particles; and, because the droplets initially have about the same size, will have a similar lifetime in the GCT from about 1 second to about 5 seconds, depending on the design and throughput of a particular GCT. The median droplet size can be adjusted such that the droplets evaporate near the exit of the GCT. Finely ground hydrated lime particles with a particle diameter in the range of 1 micron to 25 microns can be highly chemically reactive, in part because the particles have an extremely large surface area relative to the volume. The large surface-to-volume ratio of the hydrated lime particles increases the rate at which calcium hydroxide dissolves in the spray droplets. Decreasing the particle diameter of hydrated lime particles substantially below 25 microns facilitates faster dissolution of the hydrated lime particles. The release of calcium hydroxide from the dissolving hydrated lime particles can occur at a sufficiently rapid rate that the release rate does not limit the reaction that converts absorbed acidic gases into salts. For common GCT evaporative lifetimes of 1 second to 5 seconds, the hydrated lime particles can have a diameter less than about 10 microns such that the hydrated lime particles substantially dissolve in the spray droplets within the GCT before evaporation.

Also, for effective scrubbing, a high pH spray is desirable because of reduced solubility of ammonia in the high pH spray droplets. In clinker kilns the absorption of ammonia is undesirable, because ammonium sulfate salts are not thermally stable at typical GCT temperatures greater than about 235° C. Any ammonium sulfate formed in a droplet will decompose when the droplet evaporates, re-releasing ammonia and sulfur dioxide. This reduces the efficiency of the reactions that convert acidic gases into thermally stable salts. The efficiency of the scrubbing process thus increases when the quantity of hydrated lime is such that the droplets retain a high pH during their evaporative lifetime in the GCT.

As an alternative to injecting hydrated lime either dry or in the form of a slurry obtained from commercial sources in relatively pure form into a GCT to reduce the emissions of controlled pollutants in a clinker kiln, dust generated during the clinker manufacturing process can be used in the same manner to efficiently and cost-effectively reduce the emissions of controlled acidic pollutants. The dust or particulates used to reduce controlled acidic pollutants as provided by the present disclosure is referred to as "bypass dust." Bypass dust refers to particulates generated during production of clinker. Clinker kiln bypass dust contains a high content of chlorides, sulfates, and calcium oxide CaO (free lime). The calcium oxide CaO in the bypass dust can serve as an efficient absorbent of controlled acidic pollutants such as HCl, $SO_x$, and $H_2SO_4$ contained in clinker kiln preheater exhaust gases. The bypass dust can originate and be extracted from any suitable stage in the clinker production process such as at the kiln riser duct between the precalciner and the rotary kiln. The generation of bypass dust takes place during the clinker production process and therefore transportation and storage costs can be reduced compared to the use of commercial lime which must be shipped to the kiln. Bypass dust can be used to reduce the emission of controlled pollutants in a clinker kiln at least as effectively and as efficiently as commercial hydrated lime. Bypass dust is also referred to as dust.

Controlled pollutants in kiln exhaust can adsorb onto dry lime CaO particulates and/or onto hydrated lime $Ca(OH)_2$ and/or onto lime slurry droplets containing $Ca(OH)_2$ in the GCT. Binding and transport to the surfaces is expected to be more likely on humid or wet surfaces. However, adsorption of controlled acidic pollutants also occurs efficiently on dry particulate surfaces. Following adsorption, pollutants such a HCl and $SO_x$ can react with CaO or $Ca(OH)_2$ to form, for example, $CaCl_2$, $CaSO_3$, and/or $CaSO_4$.

Measurements using hydrated lime as a scrubbing material indicated that at an injection rate of about 730 lb/h the $SO_x$ emission was from 22.4 ppm to 36.3 ppm and the HCl emission was from 4.38 ppm to 5.0 ppm. At an injection rate of 1,670 lb/h the $SO_x$ emission was from 22.4 ppm to 30.8 ppm and the HCl was from 3.3 ppm to 4.3 ppm. Increasing the rate at which hydrated lime was injected into the GCT reduced the concentration of $SO_x$ and HCl in the emissions even further. Based on these and other measurements, it was determined that from about 230 mol to about 490 mol of Ca adsorbed about 1 mol of HCl, and from about 7 mol to about 108 mol of Ca adsorbed about 1 mol of $SO_x$.

These measurements were made for a particular clinker kiln system and using particular raw material. It will be appreciated that the values for the various parameters can vary depending on a number of factors that can be established for a particular clinker kiln plant and can be adjusted during operation.

Figure 2:
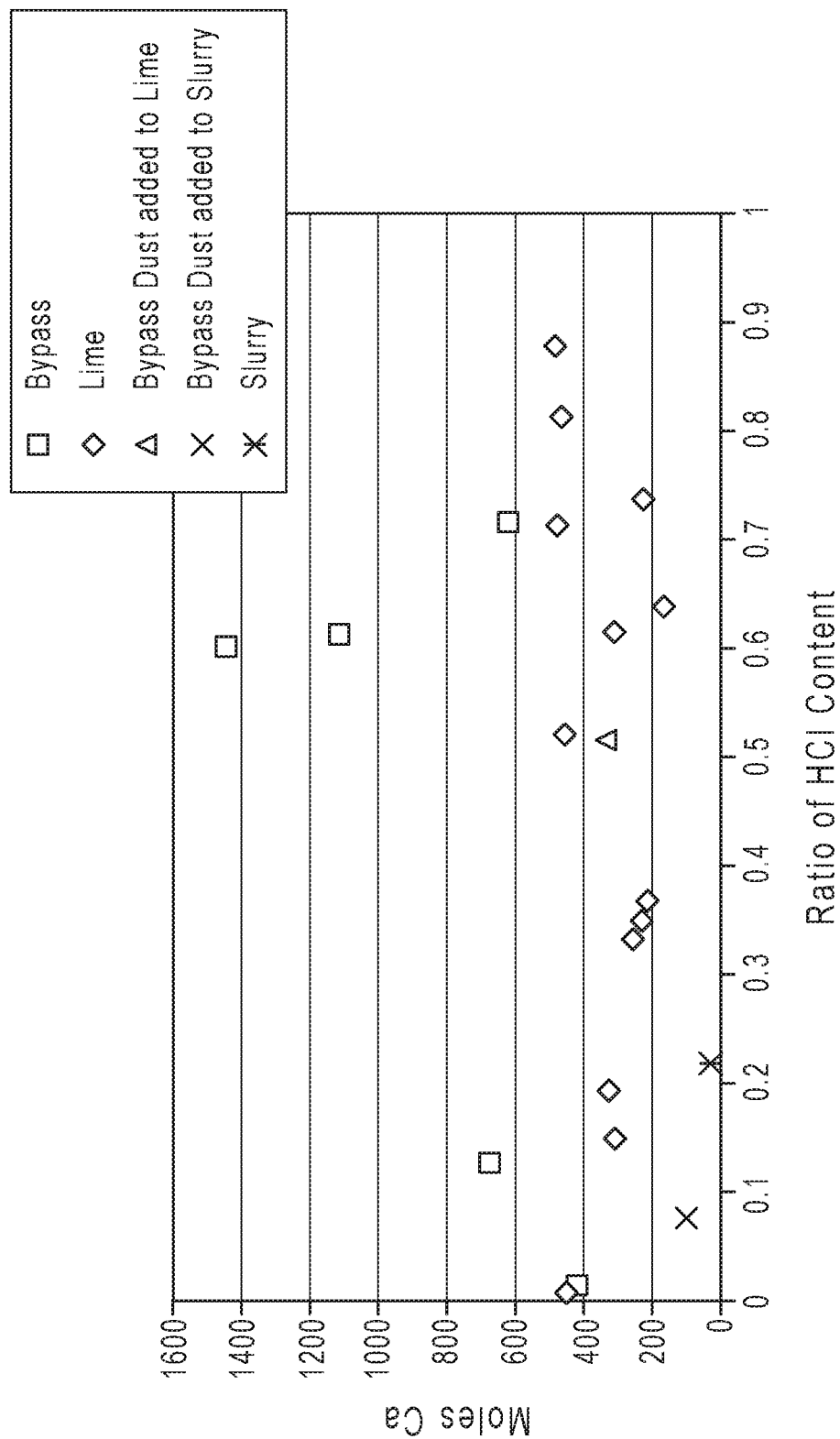
FIG. 2 is a graph showing the moles of Ca in the form of free lime CaO or hydrated lime $Ca(OH)_2$ needed to reduce the HCl content in emissions to the indicated ratio.
Figure 3:
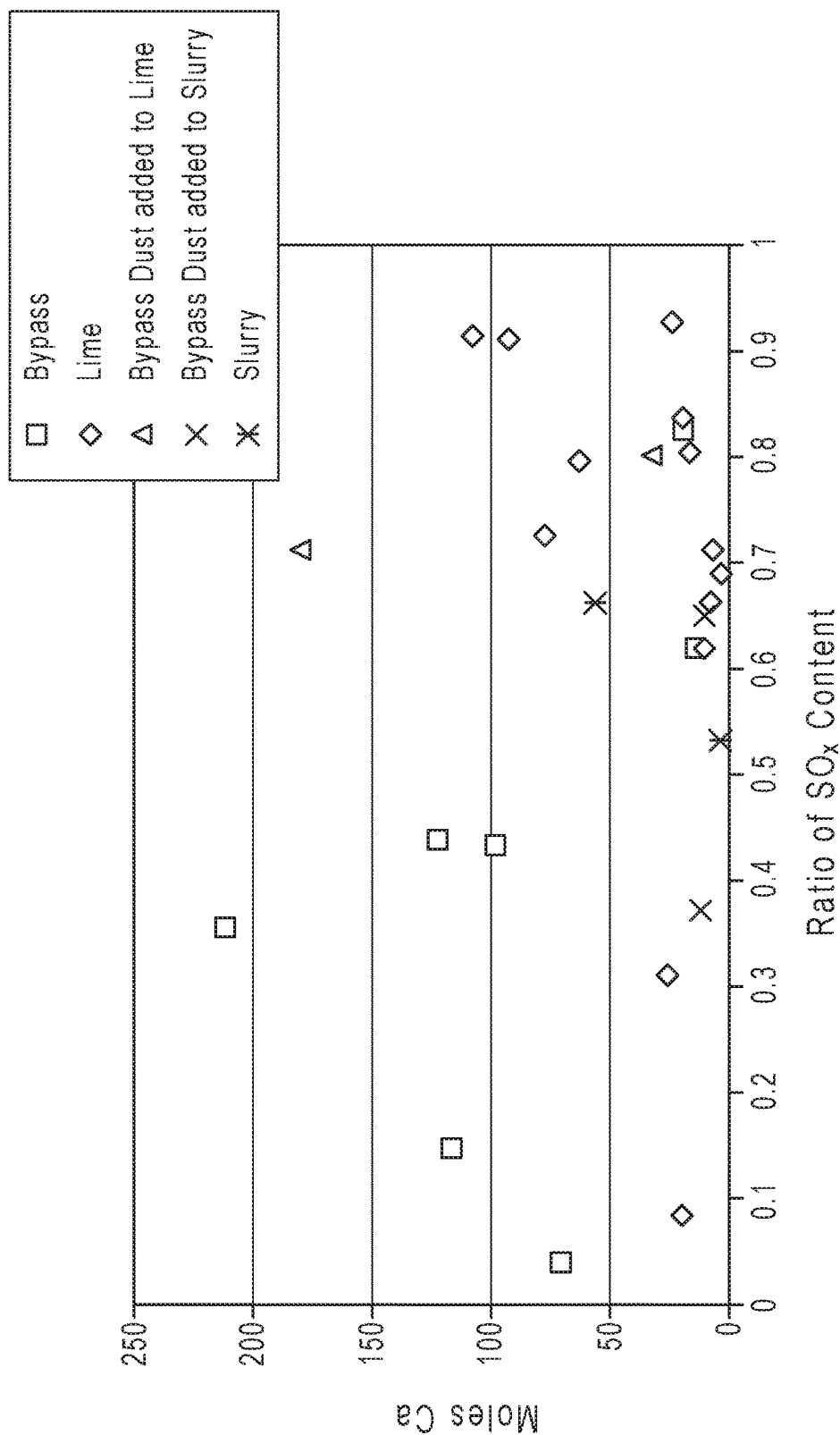
FIG. 3 is a graph showing the moles of Ca in the form of free lime CaO or hydrated lime $Ca(OH)_2$ needed to reduce the $SO_x$ content in emissions to the indicated ratio.

The reduction of HCl emissions with moles of Ca needed to produce a 1 mol reduction in HCl is shown in FIG. 2. In FIG. 2, 0.1 indicates a 90% reduction in HCl concentration, for example, from 50 mol/h to 5 mol/h, 0.2 indicates an 80% reduction in HCl concentration, and so forth. In FIGS. 2 and 3 bypass dust refers to bypass dust taken directly from the exit kiln riser that has not be separated into size fractions, lime refers to commercially obtained dry calcium hydroxide $Ca(OH)_2$, and the slurry refers to commercially obtained hydrated lime $Ca(OH)_2$ slurry.

Referring to FIG. 2, injecting a hydrated lime slurry having a solids content of about 45% had the best efficiency and reduction in HCl concentration. The results demonstrated that the use of bypass dust rather than dry lime when introduced into the exhaust gases at a suitable rate can reduce HCl emissions at least to the same extent as hydrated lime. It was noted that reducing HCl concentrations was more efficient at lower temperatures; however, other factors also appeared to affect the HCl scrubbing efficiency.

The reduction in $SO_x$ emissions with moles Ca injected into the kiln exhaust gases is shown in FIG. 3. As with HCl emissions, at certain Ca concentrations, bypass dust is at least as effective in reducing $SO_x$ concentration in kiln exhaust gas as is dry lime.

In summary, it was possible to produce a slurry from fine bypass dust that exhibited an HCl and $SO_x$ scrubbing efficiency on a moles Ca basis similar to that of a conventional hydrated lime slurry.

The results presented in FIGS. 8-11 demonstrate that on a CaO or $Ca(OH)_2$ basis, bypass dust is more efficient than lime at removing hydrogen chloride HCl and sulfur oxides $SO_x$ from kiln exhaust. Furthermore, the way in which bypass dust is injected into the GCT such as the location of injection and the manner of injection can further improve the scrubbing efficiency of bypass dust.

The data presented in FIG. 2 and FIG. 3 demonstrate that bypass dust is an effective alternative to hydrated lime for controlling HCl and $SO_x$ emissions. Bypass dust has a specific surface area that is about three times smaller than that of hydrated lime and has significantly less porosity. Furthermore, only about 28% of the mass of bypass dust is free CaO. Nevertheless, the bypass dust was demonstrated to be effective in reducing the emissions of acidic pollutants. It is possible that other components of the bypass dust increase the adsorption of HCl and $SO_x$, and thereby also contribute to the scrubbing efficiency.

Figure 4:
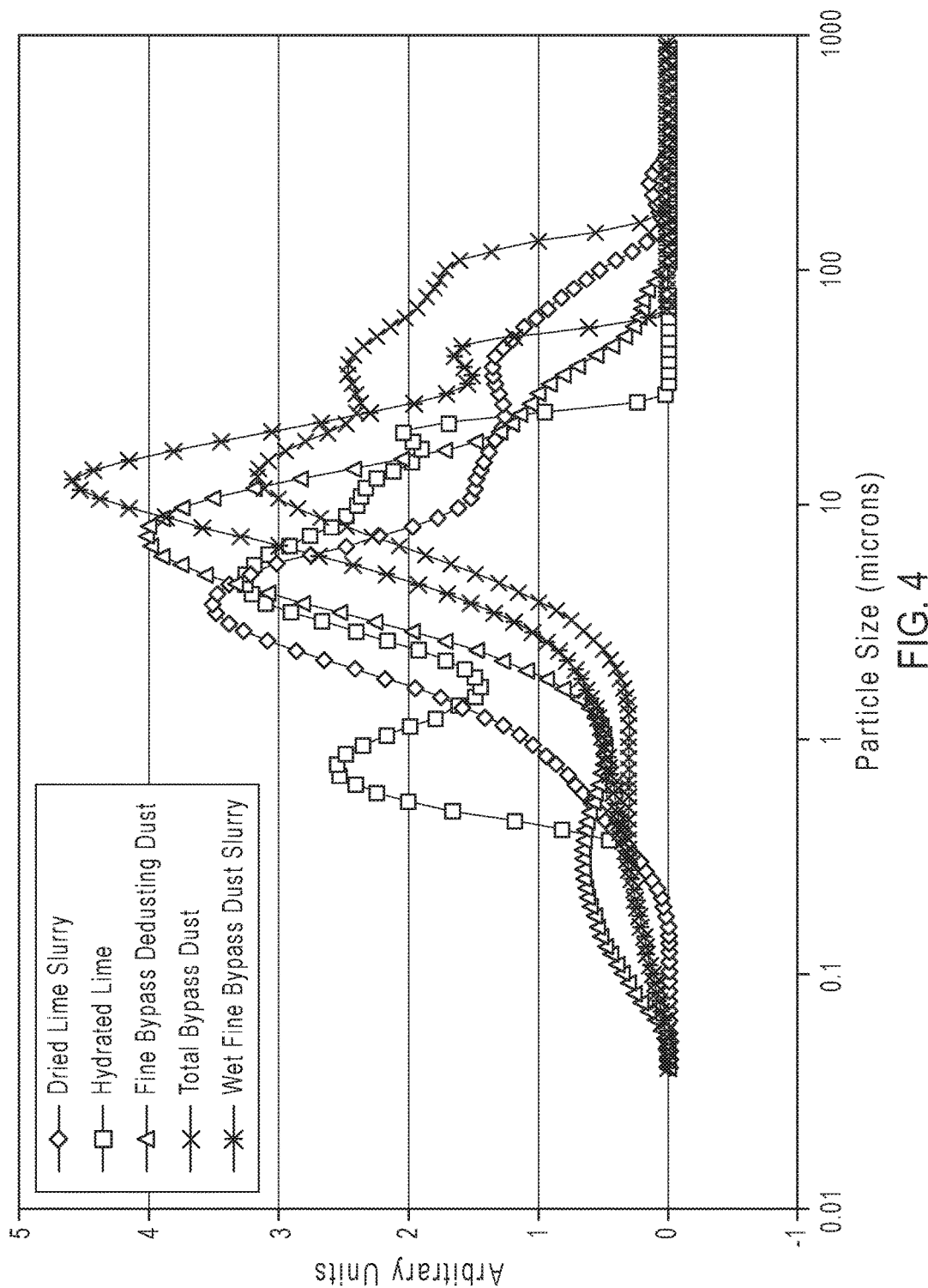
FIG. 4 is a graph showing the particle size distribution for compositions used to scrub controlled acidic pollutants from clinker kiln emissions.

FIG. 4 shows the particle size distribution of a dry lime composition, a hydrated lime slurry and three bypass dust compositions. FIG. 4 shows that the size of the fine bypass dust comprises particles having about the same size as the particles in typical dry and wet lime slurries of about 5 microns to about 10 microns. The dry lime composition was characterized by a specific surface area of 2.23 derived from the particle size distribution, which was similar to that of the wet bypass dust slurry of 2.50. The specific surface area of the fine dry bypass dust used to make the dust slurry was 5.05, which is significantly greater than that of the dry fine wet particles in the slurry, indicating that the particles forming the bypass dust swell and/or agglomerate upon exposure to water. It should be appreciated that the particulars of the particle size distribution, specific area, and mean particle diameter can vary depending on the source, and in the case of bypass dust on the particular clinker kiln, source material, and other parameters.

Hydrated lime product such as the commercial dried lime and hydrated lime are characterized by a mean particle size distribution less than about 10 microns, a wide range of particle diameters from about 0.05 microns to about 50 microns, and a specific surface area from about 2.1 to about 2.6. The fine bypass dust preparations used to obtain the results presented in FIGS. 2 and 3, exhibited a narrower, somewhat Gaussian, particle size distribution with a mean particle diameter of about 9 microns. When hydrated, the hydrated fine bypass dust particle size distribution remained essentially Gaussian but the mean particle diameter increased to about 20 microns. The specific surface area decreased from about 5.05 to about 2.23. Despite the larger mean particle diameter, the fine bypass dust slurry is expected to be at least as effective as commercially obtained hydrated lime in reducing HCl and $SO_x$ in clinker kiln emission due to the similar chemistry and particle size distribution. As demonstrated by the results presented in FIGS. 8-11, fine bypass dust slurry and total bypass dust slurry exhibit similar scrubbing efficiencies for hydrogen chloride HCl and for sulfur oxides $SO_x$ as a commercial lime slurry.

Fine bypass dust can be characterized by an average mean particle diameter from about 2 microns to about 40 microns, and the total bypass dust is characterized by an average mean particle diameter from about 20 microns to about 80 microns. In certain embodiments, fine bypass dust is characterized by an average mean particle diameter less than about 100 microns, and a coarse bypass dust is characterized by an average mean particle diameter greater than about 100 microns. Also, bypass dust whether dry or in the form of a slurry can include any suitable particle size distribution for efficiently scrubbing controlled acidic pollutants from clinker kiln emissions. Particle size can be measured, for example, using a Beckman Coulter LS 13 320 laser diffraction particle size analyzer.

It was also determined that fine bypass dust slurries are rheologically stable up to a solids content of about 65 wt %, where wt % is based on the total weight of the slurry.

In certain embodiments, a bypass dust slurry comprises one or more fractions of bypass dust where each fraction of bypass dust can be characterized by a different mean particle size, particle size distribution, and/or other property. In certain embodiments, a bypass dust slurry comprises a combination of both fine and coarse bypass dust and the ratio of coarse to fine bypass dust or any other bypass dust fraction can be adjusted to provide a desired reduction in the concentration of acidic gases. A bypass dust slurry can comprise total bypass dust where total bypass dust refers to bypass dust that has not been separated into fractions based on size or other parameter.

Figure 5:
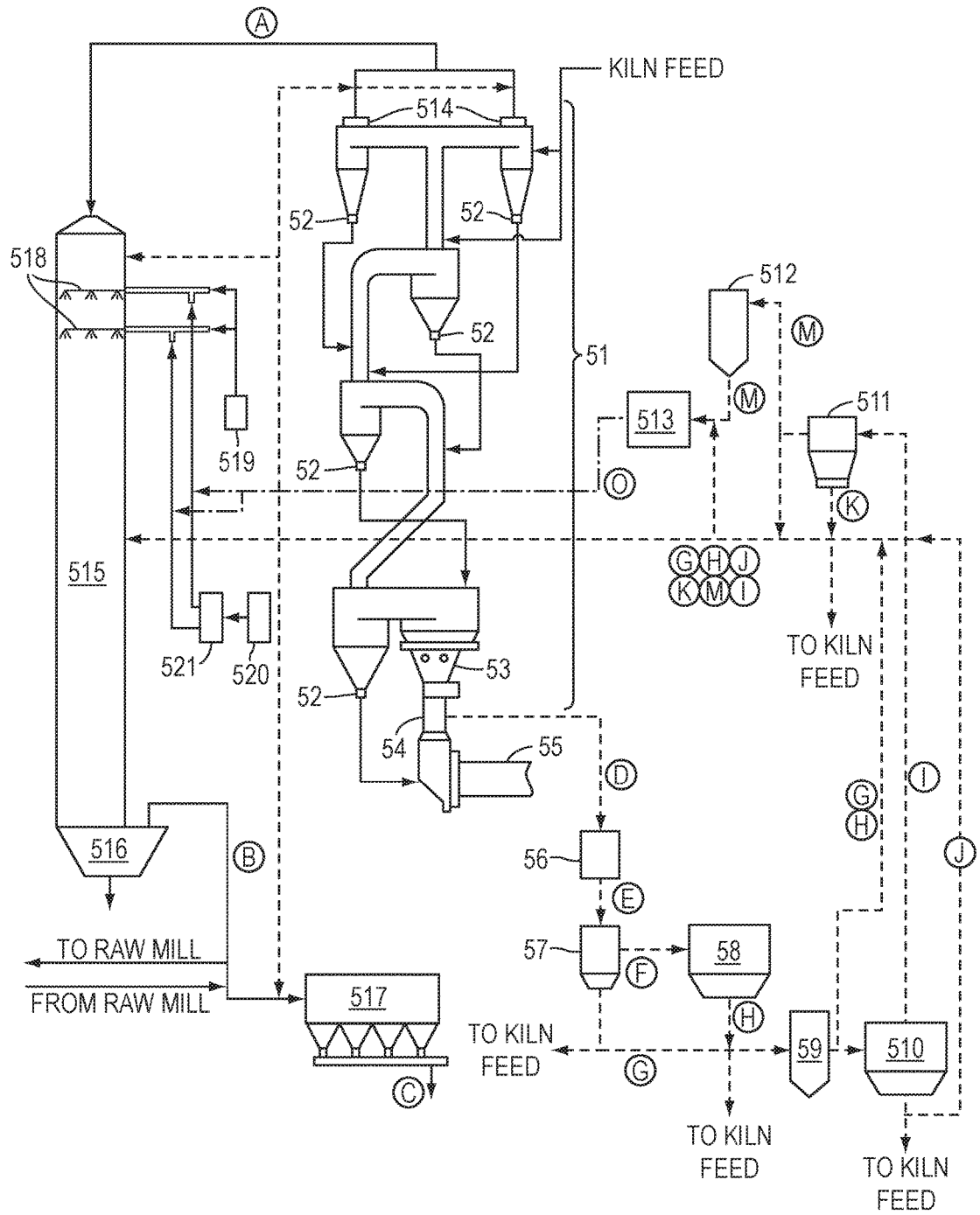
FIG. 5 is a schematic diagram showing certain components of a clinker kiln including a system for removing bypass dust from the clinker kiln riser and for introducing the bypass dust into the gas conditioning system for scrubbing acidic pollutants from the clinker kiln exhaust as provided by certain embodiments of the present disclosure.

A schematic diagram of certain components of a clinker manufacturing plant that incorporates apparatus for introducing bypass dust into a gas conditioning system is shown in FIG. 5. As described with respect to FIG. 1, kiln feed is introduced to a preheating tower 51 comprising multiple separators 52 and a precalciner 53. After entering the rotary kiln 55 the inert volatilized components leave the kiln through kiln riser duct 54. The kiln exhaust contains volatile gases and dust.

The exhaust containing the alkali bypass dust D is cooled to from about 900° C. to about 200° C. in a quenching chamber 56, optionally equipped with additional downstream false air inlets (not shown), by blowing cold air from a quench air fan and drawing in additional false air (not shown). The rapid cooling may cause acidic pollutants such as HCl and $SO_x$ entrained in the exhaust gases to condense onto the bypass dust particles. The quenched exhaust E enters an expansion chamber 57 or other separation apparatus where the bypass dust is separated from the gases. The coarse, separated bypass dust G can be fed back into the kiln feed, stored in storage 59 for later use, removed, used to make a slurry, and/or introduced into the GCT 515 or any other part of the gas conditioning system between the preheater exit 514 and the main baghouse 517 vent.

In an alternative implementation (not illustrated) kiln exhaust gases containing cooled or uncooled bypass dust may be routed from kiln exit riser 54 to the preheater exit 514 with injection of the bypass gas and entrained dust near preheater exit 514 and/or the top of the GCT 514. The amount of gas and dust will depend at least in part on the pressure drop in the preheating tower 51.

If a low efficiency separation apparatus such as an expansion chamber or a static or dynamic separator is used, a second higher efficiency separation apparatus such as a baghouse 58 can be used to collect finer bypass dust H. The finer bypass dust H can be fed back into the kiln feed, stored in storage 59 for later use, removed, used to make a scrubbing slurry and/or introduced into any other part of the system between the preheater exit and the main vent baghouse.

The bypass dust G and/or H can be stored in storage 59 and optionally separated in a downstream process using separator 510 into a finer bypass dust fraction I and a medium coarse bypass dust fraction J. Again, these fractions can be stored for later use, removed, combined with other fractions used to make a slurry and/or introduced into the GCT or any other part of the system between the preheater exit and the main vent baghouse. The fractions can be further separated using separator 511 into other fractions such as bypass dust fractions K and M, which can be stored for later use, removed, combined with other fractions used to make a scrubbing slurry and/or introduced into the GCT or any other part of the system between the preheater exit and the main vent baghouse.

One or more of the bypass dust fractions can be combined with water in mixer/slaker 513 to provide a slurry O. The slurry O can be introduced directly into one or more locations of the gas conditioning system as provided by mixer/slaker 513 and/or can be mixed with water provided by water sprays system 519-521.

The apparatus used and routing of the various bypass dust fractions shown in FIG. 5 is intended to provide an overview of various embodiments. The apparatus and methods provided by the present disclosure are intended to illustrate certain examples and are not intended to be comprehensive. Other apparatus and routing for separation, combination, and introduction of bypass dust into the gas conditioning system of a clinker kiln can be implemented.

Fine bypass dust fraction M can be introduced into the gas conditioning system either dry or combined with water to form a slurry. As shown in FIG. 5, dry fine bypass dust M can be introduced into the gas conditioning system at one and/or more locations. Bypass dust that is not introduced into the gas conditioning system can be filtered, stored, and/or reintroduced into the mill feed. The fine bypass dust introduced into the mill feed can provide high surface area free CaO surfaces for adsorption of and reaction with acidic pollutants during the preheating and precalcination stages, thereby assisting removal of acidic pollutants from the gas stream prior to clinker formation.

The fine bypass dust fraction can be optionally stored in storage 512 or can be mixed with water in a mixer, slaker, or other mixing apparatus 513 to provide a fine bypass dust slurry O. The fine bypass dust slurry O can have, for example, a solids content of from about 20 wt % to 80 wt % such as from about 40 wt % to about 65 wt %. The fine bypass dust slurry O can be pumped into the feed lines of spray lances 18 in the GCT where the slurry can optionally be combined with additional water or can be used as provided from the mixer/slaker 513. A bypass dust slurry can be introduced into the GCT at a rate from 0.1 gal/min to 150 gal/min, from 75 gal/min to 125 gal/min, or about 100 gal/min, at a solids content of fine bypass dust up to about 65 wt %. A suitable rate can depend on factors such as the concentration of the acidic pollutants in the exhaust, the desired level of scrubbing, the free lime content of the fine bypass dust in the lime slurry, and the temperature.

The clinker kiln exhaust conditioning system is primarily used to cool the exhaust gases leaving the preheater tower prior to separating the particulates. By introducing free lime CaO and/or hydrated lime $Ca(OH)_2$ into the gas conditioning system, the concentration of particulates and controlled acidic pollutants in the exhaust gases from the clinker kiln can be reduced or scrubbed. Exhaust gases comprising particulates and controlled acidic pollutants leave the preheater tower 51 and can be introduced into the inlet of the gas conditioning system at the preheater exit 514. The conditioned and cooled exhaust gases leave the exit of the gas conditioning tower 515 and are then introduced into a dust filter 517. The processed exhaust gases with a reduced concentration of particulates and controlled acidic pollutants are then released into the atmosphere.

In methods and apparatus provided by the present disclosure, bypass dust can be introduced into the exhaust conditioning system at one or more locations. For example, the bypass dust can be introduced in proximity to the exit of the preheater tower, at one or more locations in the gas conditioning tower, in proximity to the entrance of the particulate filter, or a combination of any of the foregoing. The bypass dust can be introduced in dry from, wet in the form of a slurry, or both.

Dry bypass dust can be introduced into the exhaust conditioning system at one or more locations to reduce the concentration of controlled acidic pollutants by about 20% to about 50%, or from about 30% to about 40%. Bypass dust in the form of a wet bypass dust slurry can be introduced into the gas conditioning tower through nozzles situated at one or more locations within the tower. A wet bypass dust slurry can be used to reduce the concentration of controlled acidic pollutants to acceptable levels.

Bypass dust can also be referred to as alkali bypass dust or calcined bypass dust. The bypass dust can be extracted after calcination in the precalciner and can be characterized by an active free lime content from about 8 wt % to about 80 wt %, such as from about 30 wt % to about 60 wt %. By active free lime CaO content is meant that the bypass dust has a high amount of reactive calcium oxide CaO.

The wt % bypass dust in the bypass dust slurry can be selected to obtain a desired reduction in controlled acidic pollutants in the clinker kiln emissions. A suitable wt % can be established based on, for example, the chemical composition of the raw feed, the concentration of the controlled acidic pollutants in the exhaust gases, the temperature of the exhaust gases at various stages in the gas conditioning system, the flow rate of the exhaust gases in the gas conditioning system, the particulate content of the exhaust gases, the rate at which the bypass slurry is introduced into the gas conditioning system, the location at which the bypass dust is introduced into the gas conditioning system, and other factors. The factors affecting the rate and concentration at which the bypass dust is introduced into a gas conditioning system can be manually or automatically adjusted to provide a suitable level of controlled acidic pollutants in the clinker kiln emissions. These factors can also be influenced by the physical dimensions and layout of a particular clinker kiln.

It would be possible to use instead of bypass dust, precalciner exit dust that has as well a high percentage of free CaO. That dust would be taken, for example, from separator 52 in FIG. 5.

FIG. 5 shows an example of a clinker kiln in which bypass dust can be generated and continuously introduced into a gas conditioning system during operation of a clinker kiln. Alternatively, bypass dust can be generated and stored for later use and introduction into the gas conditioning system. For example, in certain embodiments, kiln exhaust D is cooled in quench air chamber 56, separated in expansion chamber 57, filtered in baghouse 58, and the coarse particulates from expansion chamber 57 and fine particulates collected by the baghouse 58 are combined and introduced into one or more locations in the gas conditioning system between the preheater exit 514 and the main baghouse 517 vent. In certain embodiments, the coarse particulates extracted from the expansion chamber are reintroduced into the kiln feed, and the fine particulates collected by the baghouse are introduced into one or more locations in the gas conditioning system between the preheater exit 514 and the main baghouse 517 vent. In certain embodiments, the coarse particulates extracted from the expansion chamber are reintroduced into the kiln feed, and the fine particles from the baghouse are optionally stored, and further separated into a coarse bypass dust fraction, which can be reintroduced into the kiln feed, and a fine bypass dust fraction, which can be introduced into one or more locations in the gas conditioning system between the preheater exit 514 and the main baghouse 517 vent. In certain embodiments, further to the previous example, the fine bypass dust fraction can be filtered in a baghouse 511, optionally stored in storage 512, and combined with water to form a fine bypass dust slurry, which can be introduced into one or more locations in the gas conditioning system between the preheater exit 514 and the main baghouse 517 vent. In certain embodiments, both the coarse bypass dust fraction from expansion chamber 57 and the fine bypass dust fraction from baghouse 58 are combined, optionally stored in storage 59, and separated using separator 510 to provide a coarse bypass dust fraction J, which can be introduced into one or more locations in the gas conditioning system between the preheater exit 514 and the main baghouse 517 vent, and a fine bypass dust fraction I, which can be further separated using separator 511 to provide finer bypass dust fraction M, optionally stored in storage 512, and mixed with water in mixer/slaker 513 to provide a fine bypass dust slurry O, which can be introduced into one or more locations in the gas conditioning system between the preheater exit 514 and the main baghouse 517 vent. In certain embodiments, the coarse bypass dust from expansion chamber 57 and the fine bypass dust from baghouse 8 can be combined, optionally stored in storage 59, and mixed with water in mixer/slaker 513 to provide a fine bypass dust slurry O, which can be introduced into one or more locations in the gas conditioning system between the preheater exit 514 and the main baghouse 517 vent. Alternatively, only the fine bypass dust from baghouse 58 can be mixed with water in mixer/slaker 513 to provide a fine bypass dust slurry O, which can be introduced into one or more locations in the gas conditioning system between the preheater exit 514 and the main baghouse 517 vent. As an alternative to certain of the preceding embodiments, expansion chamber 57 may not be used, such that the quenched gases and particulates from quench air chamber 56 are introduced directly into baghouse 58, and the fine bypass dust is optionally stored, further separated using a separator and/or baghouse, combined with water to form a slurry, and introduced in dry and/or wet form into one or more locations in the gas conditioning system between the preheater exit 514 and the main baghouse 517 vent. In certain embodiments, rather than cool the kiln exhaust with air in a quench air chamber, cooling can be performed using, for example, a water spray and/or evaporation with or without air cooling.

As an alternative to certain of the preceding embodiments, kiln exit gases containing bypass dust (D) may be redirected to the preheater exit (514) or GCT inlet (518). Those gases can be cooled (E) with ambient air intake or water evaporation or may be used without being cooled. This implementation presents a simple alternative that can be attractive for kilns that do not currently operate a bypass.

The bypass dust can be separated into two or more fractions characterized by different particle sizes. For example, the bypass dust can be separated into a fine bypass dust fraction characterized by an average particle diameter less than about 100 microns and a coarse bypass dust fraction characterized by an average particle diameter greater than about 100 microns. The bypass dust can be separated into other fractions characterized by a particular average maximum and/or minimum particle size diameter and/or average particle size distribution. Furthermore, the bypass dust or fraction of the bypass dust can be subjected to further processing such as grinding to modify the average particle size diameter and/or particle size distribution.

The methods and apparatus provided by the present disclosure are also expected to reduce the concentration of mercury Hg content in the kiln emissions.

Figure 6:
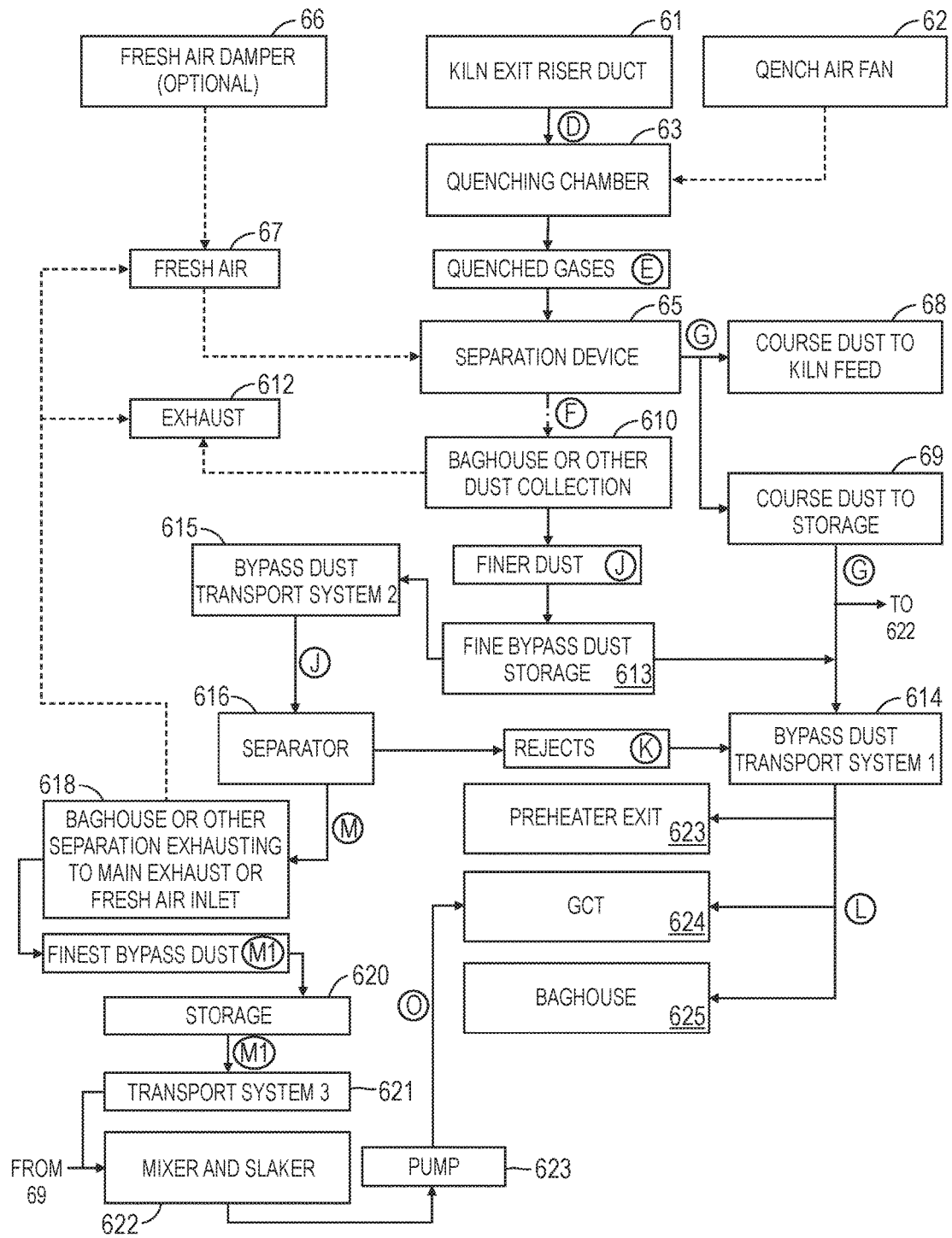
FIG. 6 shows a flow diagram of a controlled pollutant scrubbing system using bypass dust as provided by certain embodiments of the present disclosure.

FIG. 6 shows a block diagram of certain apparatus used in the processing of bypass dust for use in scrubbing clinker in a gas conditioning system. Exhaust gases containing particulates (bypass dust) and volatile gases passing through the precalciner are extracted from the clinker plant at the kiln riser duct 61. The exhaust gas D is rapidly quenched to a temperature from about 900° C. to 200° C. with cold air forced into quenching chamber 63 by quench air fan 62. A certain amount of the controlled acidic pollutants such as HCl and $SO_x$ entrained in the exhaust gas is absorbed on the cooled particulates. The quenched exhaust gas E enters an expansion chamber 65 or other separation apparatus where the particulates entrained in the exhaust are separated from the gas. The expansion chamber can be viewed as a very inefficient separator that can be used to classify the particulates by size, density or other characteristic. For example, coarse particulates G having an average diameter greater than about 100 microns can be separated and either fed back into the raw materials forming the kiln feed 68, can be optionally stored in coarse dust storage 69 for later use, or can be fed directly into the gas conditioning system L at one or more locations such as, for example, the preheater exit 623, the gas conditioning tower (GCT) 624, or the baghouse 625. The coarse particles G can also be introduced into mixer/slaker 622 where the particulates are mixed with water to form a coarse bypass dust slurry. The fine particulates F separated by expansion chamber 65 can be filtered using a baghouse 610 or other dust collection apparatus such as an electrostatic precipitator. The fine particulates J can be optionally stored in fine bypass dust storage 613 for later use, introduced into the kiln feed (not shown), fed into the gas conditioning system L, optionally combined with coarse bypass dust and/or worked into a slurry.

As shown in FIG. 6, the coarse particulates and the fine particulates can be fed as coarse bypass dust and fine bypass dust into the gas conditioning system. The amounts of coarse and fine bypass dust introduced into the gas conditioning system can be determined, in part, by the amounts of controlled pollutants desired to be removed from the kiln exhaust. Furthermore, the coarse and fine bypass dust can be introduced into the gas conditioning system at one or more locations between the preheater exit 623 and the inlet to baghouse 625. As shown in FIG. 6, coarse bypass dust from optional dust storage 69 can be transported by coarse bypass dust transport system 614 and introduced into one or more of the preheater exhaust exit 623, the GCT 624, and the inlet to dust collector 625.

Fine bypass dust J can be transported from optional bypass dust storage 613 by fine bypass dust transport system 615 and optionally filtered by separator 616 to further select the size and/or size distribution of the particulates making up the fine bypass dust. Any rejects K such as large particulates and/or agglomerates can be added to the coarse bypass dust, removed or reintroduced into the feed mill and/or the kiln feed. The separated fine bypass dust M can be further filtered using baghouse 618 to provide finer bypass dust M1. Finer bypass dust M1 can be optionally stored in storage 620, and transported using transport system 621 to mixer/slaker 622 where the finer bypass dust can be optionally combined with the coarse bypass dust one or more other bypass dust fractions and water to form a slurry O, which can be pumped using pump 623 to the GCT 624 or into one or more locations between the preheater exit 623 and baghouse 625. The filtered fine bypass dust M can be optionally stored in storage 620 and transported using transport system 621 to mixer/slaker 622 where the fine bypass dust can be mixed with water to form a fine bypass dust slurry O. The fine bypass dust slurry O can then be pumped into the gas conditioning system to reduce the concentration of controlled pollutants in the exhaust gases. The separated fine bypass dust can further be filtered using a baghouse 618 or other separation apparatus to provide bypass dust M.

Figure 7:
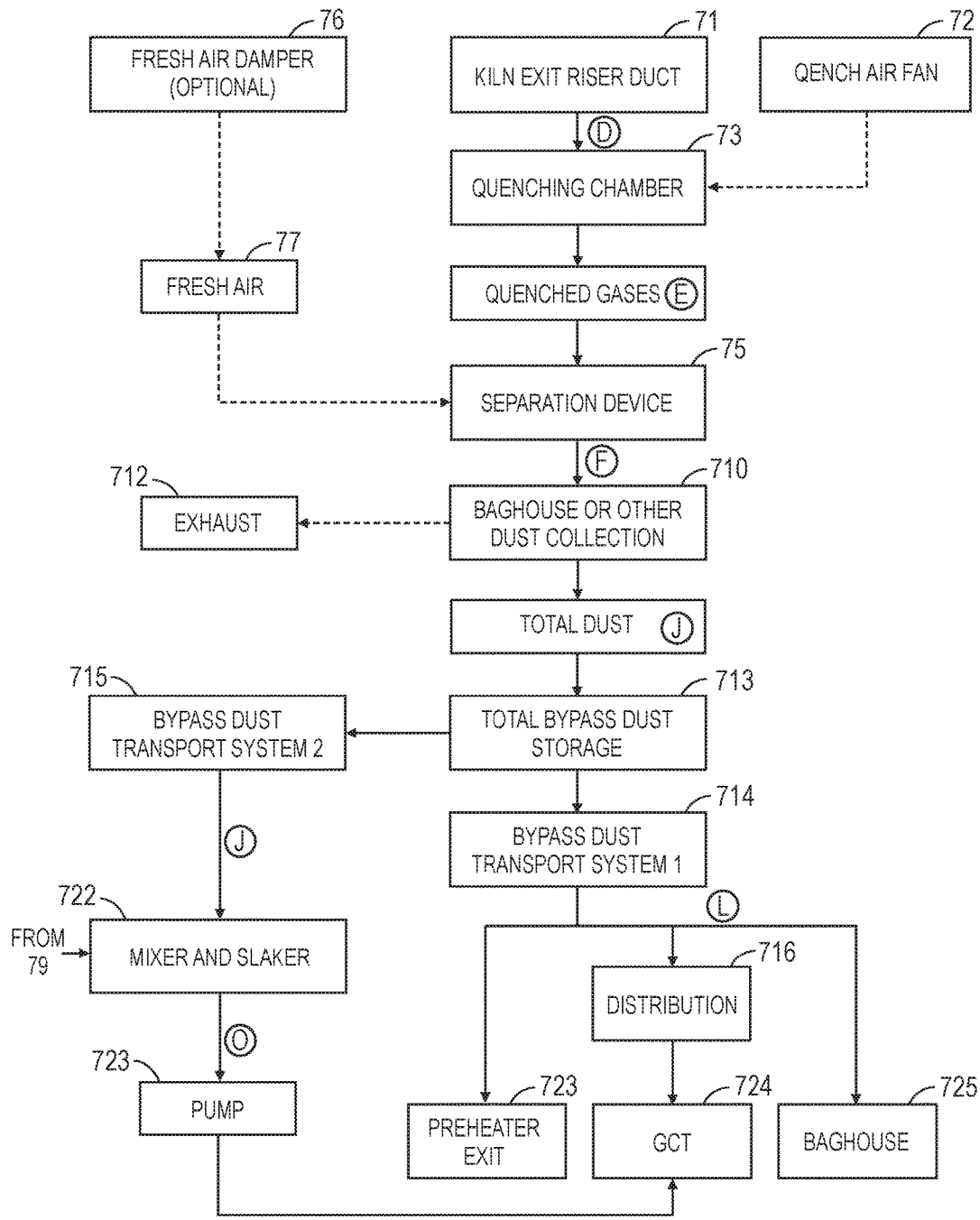
FIG. 7 shows a flow diagram of an alternative controlled pollutant scrubbing system using bypass dust as provided by certain embodiments of the present disclosure.

FIG. 7 shows a block diagram of certain apparatus used in the processing of bypass dust for use in scrubbing clinker in a gas conditioning system. In the apparatus shown in FIG. 7 the bypass dust is not separated into fine and coarse fractions, such that the unseparated total bypass dust is used to reduce controlled gas emissions.

Exhaust gases containing particulates (bypass dust) and volatile gases passing through the precalciner are extracted from the clinker plant at the kiln riser duct 71. The exhaust gas D is rapidly quenched to a temperature from about 900° C. to 200° C. with cold air forced into quenching chamber 73 by quench air fan 72. A certain amount of the controlled acidic pollutants such as HCl and $SO_x$ entrained in the exhaust gas is absorbed on the cooled particulates. The quenched exhaust gas E enters an expansion chamber 75 or other separation apparatus where the particulates entrained in the exhaust are separated from the exhaust gas.

The particulates F separated by separation device 75 can be filtered using a baghouse 710 or other dust collection apparatus such as an electrostatic precipitator. The particulates J can be optionally stored in bypass dust storage 713 for later use, introduced into the kiln feed (not shown), fed into the gas conditioning system L, optionally combined with coarse bypass dust and/or worked into a slurry. Total bypass dust can be transported by bypass dust transport system 1 (714) and introduced into one or more of the preheater exhaust exit 723, distribution 716, the GCT 724, and/or the inlet to dust collector/baghouse 725.

The total bypass dust can be transported to bypass dust transport system 2 (715) and transported to mixer/slaker 722 where the bypass dust can be optionally combined with water 79 to form a slurry O, which can be pumped using pump 723 to the GCT 724 or into one or more locations between the preheater exit 723 and baghouse 725.

EXAMPLES

Embodiments provided by the present disclosure are further illustrated by reference to the following examples, which describe the effects of using bypass dust to reduce the content of controlled acidic gases in clinker kiln emissions.

A clinker kiln was operated and either lime or bypass dust was injected into the GCT to remove acidic pollutants. The results are presented in FIGS. 8-11. In FIGS. 8-11 the molar ratio of either hydrogen chloride HCl or sulfur oxides $SO_x$ emissions to potential mol/h $Ca(OH)_2$ injected into the GCT is presented with potential mol/h $Ca(OH)_2$ input.

CaO as free lime in bypass dust and hydrated lime $Ca(OH)2$ are the likely reactants for the acidic gas components. CaO will react with the cooling water being injected into the GCT to generate hydrated lime $Ca(OH)_2$. Therefore, whether hydrated lime or bypass dust is injected into the GCT, it is appropriate to compare the different injections in terms of potential $Ca(OH)_2$ input and permits a direct comparison between the lime slurry and the bypass dust based on the input of $Ca(OH)_2$ and CaO input and reflects the demonstration that CaO in the bypass dust can act as an efficient absorber of acidic gases without being transformed into $Ca(OH)_2$.

Referring to FIGS. 8-11, lime slurry refers to a lime slurry that was prepared on-site by combining dry $Ca(OH)_2$ and water to provide a slurry having 20 wt % to 40 wt % solids such as from 30 wt % to 40 wt % solids. The Neutralac® SLS45 slurry refers to 45 wt % solids commercially available lime slurry obtained from LHoist North America. All lime trials refer to trials in which $Ca(OH)_2$ was injected into the GCT, which can differ in the point of injection but were within about 8 inches. The regression curve for all lime trials is also shown.

Referring to FIGS. 8-11, fine bypass dust slurry refers to a 20 wt % to 40 wt %, solids, such as from 30 wt % to 40 wt % solids slurry prepared from a fine bypass dust fraction generally having a particle size less than 80 µm. Total bypass dust slurry refers to a 20 wt % to 40 wt % solids slurry prepared from the total bypass dust. All Bypass Dust (1) and All Bypass Dust (2) refer to results obtained by injecting total bypass dust into the GCT. In Total Bypass Dust (1) the dust was injected through a single nozzle just above the water injection ports; and in All Bypass Dust (2) the dust was injected well above the water injection ports and above buffer blades through multiple nozzles. Therefore, the points of injection for the All Bypass Dust (1) and All Bypass Dust (2) runs were substantially different (compared the All lime trials discussed above, which were within about 8 inches of each other). The regression lines for All Bypass Dust (1) and All Bypass Dust (2) are shown in the figures.

In FIGS. 8-11 a high acidic emission of either hydrogen chloride HCl or sulfur oxides $SO_x$, or a very low $Ca(OH)_2$ input will result in a high ratio. Due to dust recirculation at the preheater exit there will always be at least some potential $Ca(OH)_2$ in the form of free lime CaO present in the dust leaving the tower. The graphs show that with no $Ca(OH)_2$ injection there is a high acidic content, and with increasing potential $Ca(OH)_2$ input either in the form of hydrated $Ca(OH)_2$ in dry or slurry form or as bypass dust (CaO and $Ca(OH)_2$) in dry or slurry form the acidic emissions are reduced. By comparing the regression curves, it can be appreciated that bypass dust injection is more efficient at removing hydrogen chloride HCl and sulfur oxides $SO_x$ from the kiln gas than is dry lime or any slurry. The dramatic improvement in the efficiency for the All Bypass Dust (2) injection compared to All Bypass Dust (1) injection demonstrates that adjustments to the implementation of bypass dust injection can lead to increased scrubbing efficiency.

Figure 8:
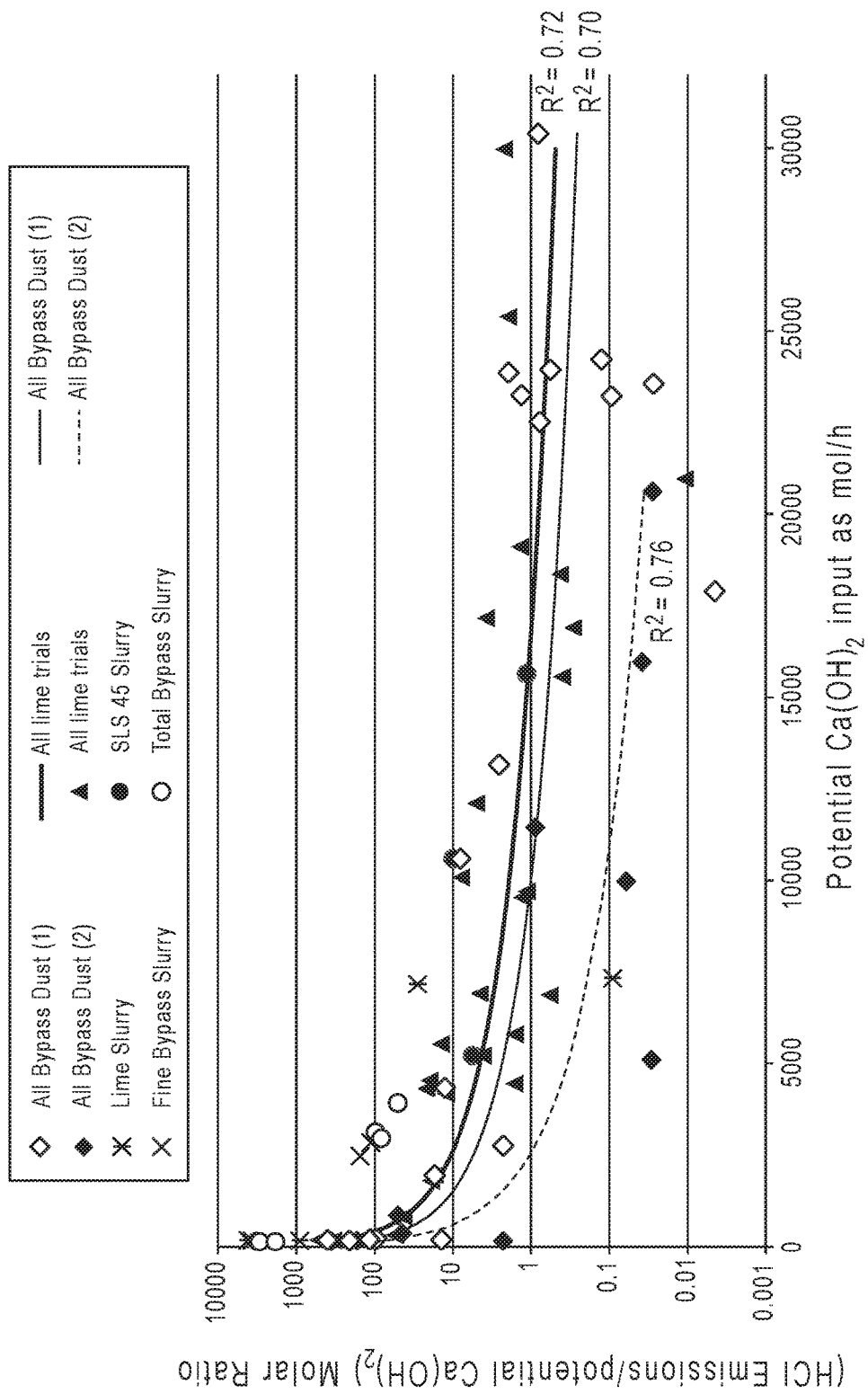
FIG. 8 shows the molar ratio of HCl emissions to potential $Ca(OH)_2$ with potential $Ca(OH)_2$ input using lime or bypass dust injection to remove controlled pollutants from clinker kiln exhaust.
Figure 9:
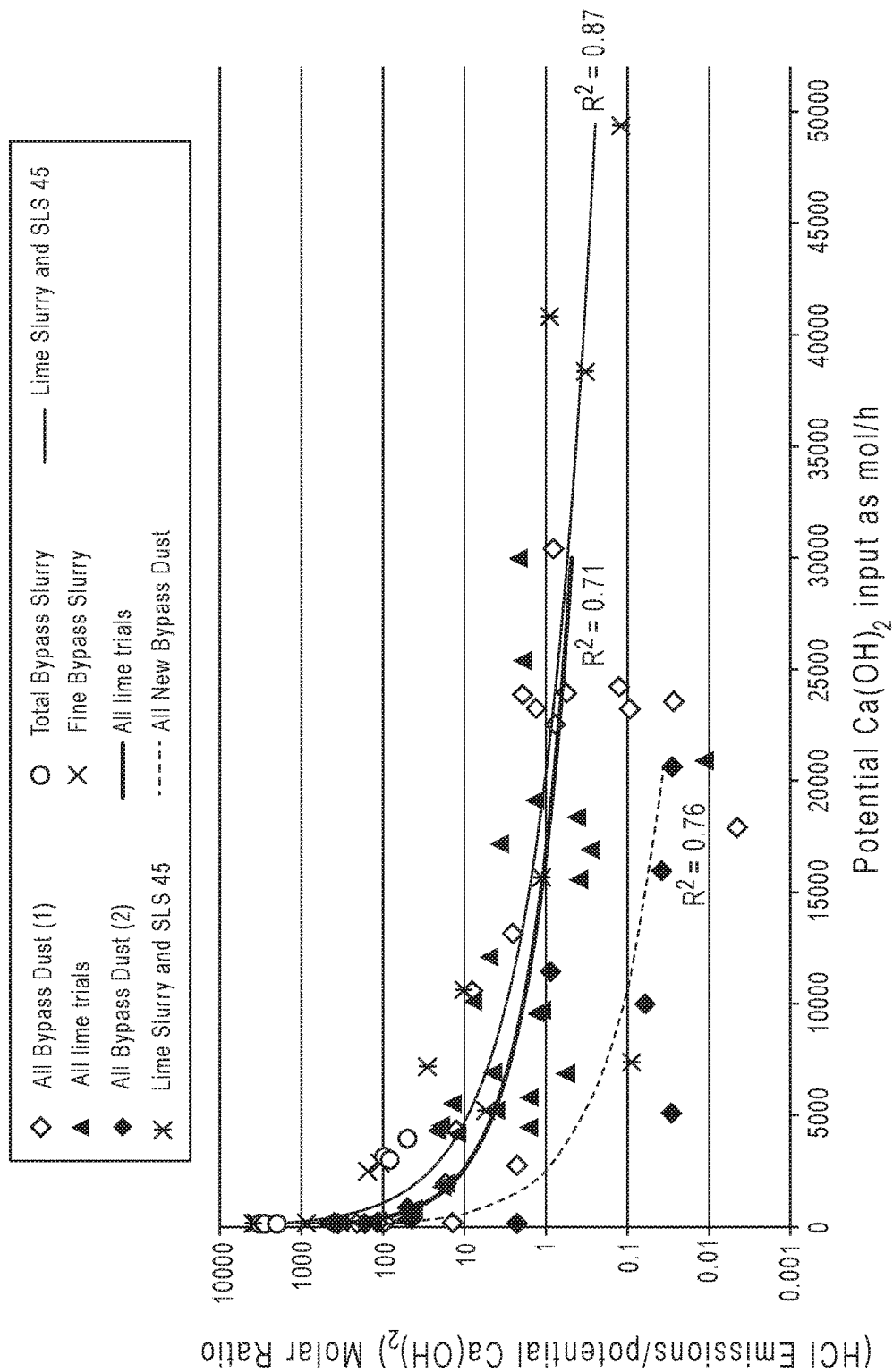
FIG. 9 shows the molar ratio of hydrogen chloride HCl emission to potential $Ca(OH)_2$ with potential $Ca(OH)_2$ input using lime or bypass dust injection to remove controlled pollutants from clinker kiln exhaust.

FIG. 9 re-presents the data presented in FIG. 8 extended to higher effective $Ca(OH)_2$ input and includes the regression curve for lime slurry. As shown in FIG. 9, the dry lime injection and the lime slurry have a similar effect on reducing hydrogen chloride HCl emission. The injection of dry lime in general exhibits better efficiency at high hydrogen chloride HCl concentrations and lime slurry has better efficiency at lower hydrogen chloride HCl concentrations.

Figure 10:
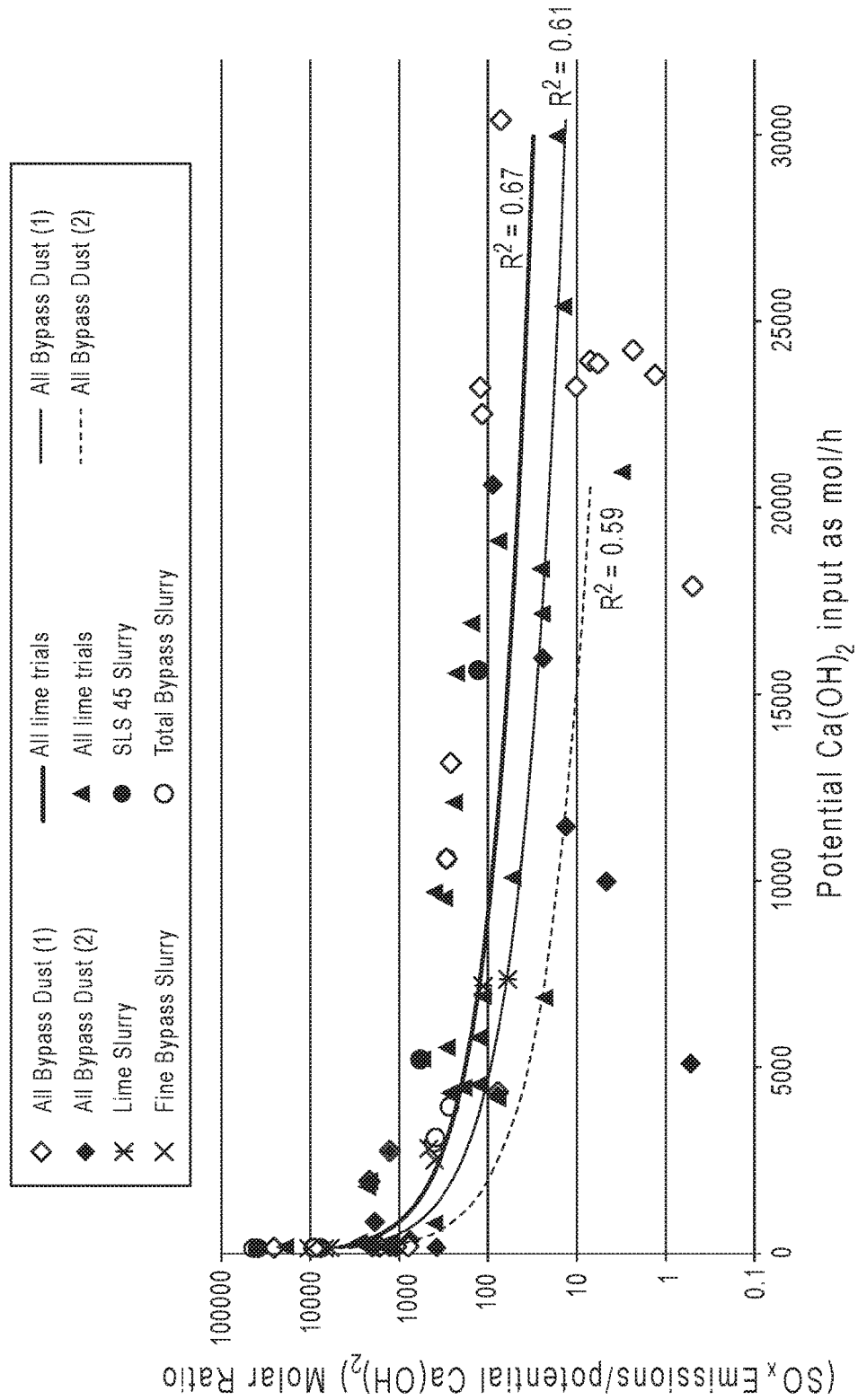
FIG. 10 shows the molar ratio of sulfur oxides $SO_x$ emission to potential $Ca(OH)_2$ with potential $Ca(OH)_2$ input using lime or bypass dust injection to remove controlled pollutants from clinker kiln exhaust.
Figure 11:
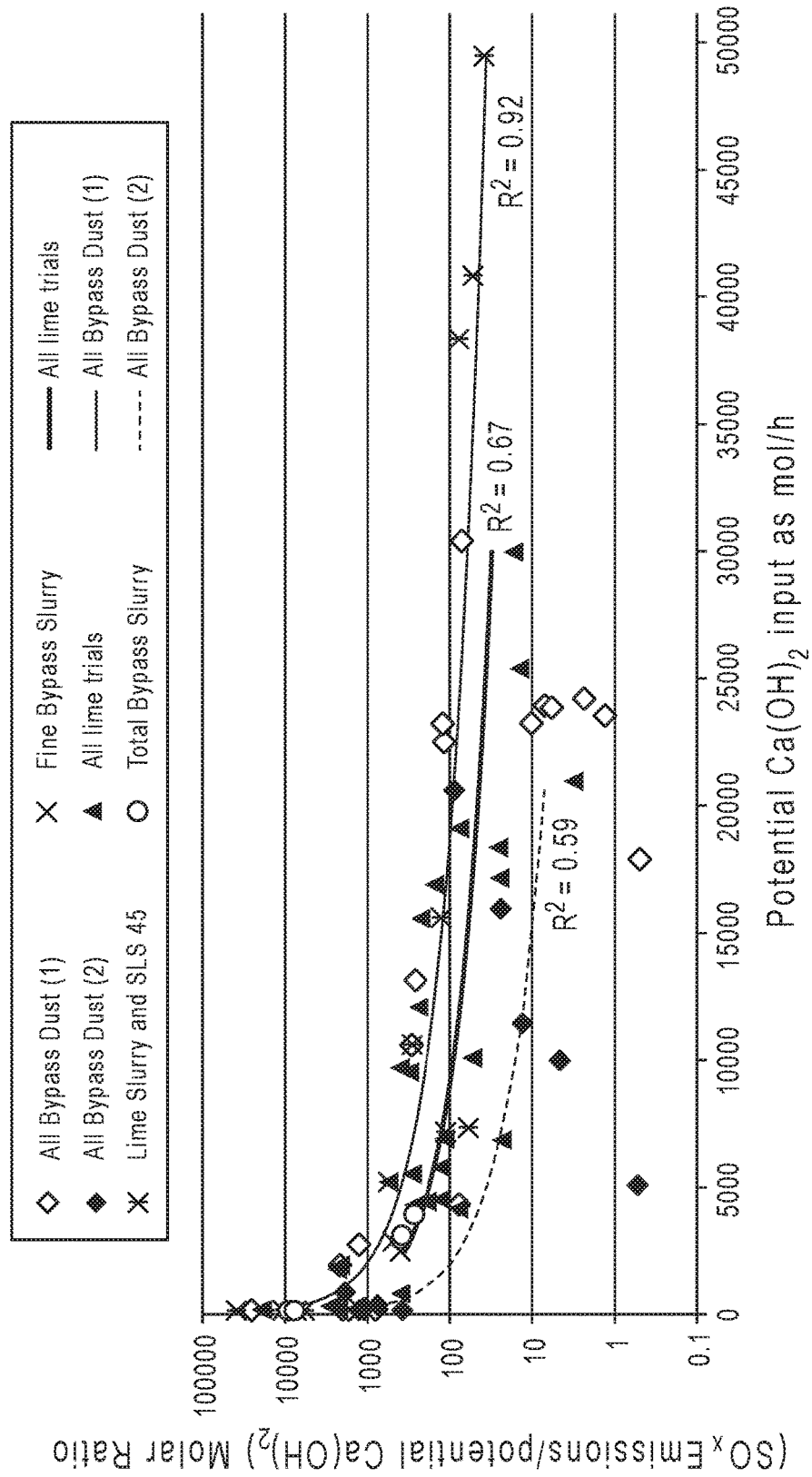
FIG. 11 shows the molar ratio of sulfur oxides $SO_x$ emission to potential $Ca(OH)_2$ with potential $Ca(OH)_2$ input using lime or bypass dust injection to remove controlled pollutants from clinker kiln exhaust.

FIGS. 10 and 11 show that All Bypass Dust (2) injection is also more efficient than lime at removing sulfur oxides $SO_x$ from the kiln exhaust; and the dry lime is a little more efficient than lime slurry in removing sulfur oxides from kiln emission.

In aspects of the invention, methods for reducing the concentration of controlled pollutants in clinker kiln emissions comprise providing a clinker kiln, wherein the clinker kiln comprises a gas conditioning system configured to process exhaust gases from the clinker kiln; and introducing bypass dust generated during operation of the clinker kiln at one or more locations in the gas conditioning system, to reduce the concentration of controlled pollutants in the clinker kiln emissions.

In any of the preceding aspects, the gas conditioning system comprises a preheater exhaust exit; a gas conditioning tower operatively coupled to the preheater exhaust exit; and an inlet to a dust collector.

In any of the preceding aspects, introducing the bypass dust comprises introducing the bypass dust in proximity to the preheater exhaust exit, into the gas conditioning tower, in proximity to the inlet to the dust collector, or a combination of any of the foregoing.

In any of the preceding aspects, the bypass dust comprises alkali-bypass dust.

In any of the preceding aspects, the bypass dust comprises calcined bypass dust and partially calcined bypass dust.

In any of the preceding aspects, the controlled pollutants comprise controlled acidic pollutants.

In any of the preceding aspects, the bypass dust comprises fine bypass dust characterized by an average particle size less than 100 microns.

In any of the preceding aspects, the bypass dust comprises fine bypass dust characterized by an average mean particle diameter from 4 microns to 80 microns.

In any of the preceding aspects, the bypass dust comprises total bypass dust.

In any of the preceding aspects, the bypass dust is characterized by a calcium oxide (CaO) content from 8 wt % to 80 wt %, wherein wt % is based on the total solids content of the bypass dust.

In any of the preceding aspects, the bypass dust comprises a bypass dust slurry, wherein the bypass dust slurry comprises bypass dust and water.

In any of the preceding aspects, the bypass dust comprises a fine bypass dust slurry, wherein the fine bypass dust slurry comprises fine bypass dust characterized by an average particle size less than 100 microns, and water.

In any of the preceding aspects, the fine bypass dust slurry is characterized by a solids content from 20 wt % to 80 wt %, wherein wt % is based on the total weight of the fine bypass dust slurry.

In any of the preceding aspects, the methods further comprise separating the bypass dust into coarse bypass dust and fine bypass dust, wherein introducing bypass dust comprises introducing coarse bypass dust, introducing fine bypass dust, or introducing a combination thereof.

In any of the preceding aspects, the coarse bypass dust is characterized by an average mean particle diameter greater than 100 μm; and the fine bypass dust is characterized by an average mean particle diameter less than 100 m.

In any of the preceding aspects, the fine bypass dust is characterized by an average mean particle diameter from 2 microns to 40 microns; and the coarse bypass dust is characterized by an average mean particle diameter from 20 microns to 80 microns.

In any of the preceding aspects, the fine bypass dust is characterized by a calcium oxide (CaO) content from 25 wt % to 80 wt %, wherein wt % is based on the total weight of the fine bypass dust.

In any of the preceding aspects, introducing the bypass dust comprises introducing the coarse bypass dust into the gas conditioning tower; introducing the fine bypass dust into the gas conditioning tower; or introducing both the coarse bypass dust and the fine bypass dust into the gas conditioning tower.

In any of the preceding aspects, introducing the bypass dust comprises introducing the coarse bypass dust in proximity to the preheater exhaust exit, into one or more locations in the gas conditioning tower, in proximity to the inlet of the dust collector, or a combination of any of the foregoing; and introducing the fine bypass dust into the gas conditioning tower.

In any of the preceding aspects, methods further comprise mixing the fine bypass dust with water to provide a fine bypass dust slurry; and introducing the fine bypass dust slurry into the gas conditioning tower.

In any of the preceding aspects, the fine bypass dust slurry is characterized by a solids content from 20 wt % to 80 wt %, wherein wt % is based on the total weight of the fine bypass dust slurry.

In aspects of the invention, a clinker plant comprises a gas conditioning system comprising a preheater exit, a gas conditioning tower, and a main baghouse; one or more separators for separating dust generated during the production of clinker into one or more dust fractions; and an injector for introducing at least one of the one or more dust fractions into the gas conditioning system at one or more locations between the preheater exit and the main baghouse.

In any of the preceding aspects, a clinker plant further comprises a mixer configured to combine water and at least one of the one or more dust fractions to provide a dust slurry.

In any of the preceding aspects, the injector is configured to introduce at least one of the more dust fractions comprises introducing a dust slurry at one or more locations between the preheater exit and the main baghouse.

In an aspect of the present invention, methods for reducing the concentration of controlled pollutants in clinker kiln emissions, comprise providing a clinker kiln, wherein the clinker kiln comprises a gas conditioning system configured to process exhaust gases from the clinker kiln; and introducing dust generated during operation of the clinker kiln at one or more locations in the gas conditioning system, to reduce the concentration of controlled pollutants in the clinker kiln emissions.

In any of the preceding aspects, the gas conditioning system comprises a preheater exhaust exit; a gas conditioning tower operatively coupled to the preheater exhaust exit; and an inlet to a dust collector.

In any of the preceding aspects, introducing the bypass dust comprises introducing the bypass dust in proximity to the preheater exhaust exit, into the gas conditioning tower, in proximity to the inlet to the dust collector, or a combination of any of the foregoing.

In any of the preceding aspects, the dust comprises bypass dust.

In any of the preceding aspects, the dust comprises calcined dust and partially calcined dust.

In any of the preceding aspects, the controlled pollutants comprise controlled acidic pollutants.

In any of the preceding aspects, the dust comprises total dust separated from the kiln exhaust In any of the preceding aspects, the dust is characterized by a calcium oxide (CaO) content from 8 wt % to 80 wt %, wherein wt % is based on the total solids content of the dust.

In any of the preceding aspects, the methods further comprise separating the dust into coarse dust and fine dust, wherein introducing dust comprises introducing coarse dust, introducing fine dust, or introducing a combination thereof.

In any of the preceding aspects, the coarse dust is characterized by an average mean particle diameter greater than 100 μm; and the fine dust is characterized by an average mean particle diameter less than 100 m.

In any of the preceding aspects, introducing the dust comprises introducing the coarse dust into the gas conditioning tower; introducing the fine dust into the gas conditioning tower; or introducing both the coarse dust and the fine dust into the gas conditioning tower.

In any of the preceding aspects, the methods further comprise mixing the fine dust with water to provide a fine dust slurry; and introducing the fine dust slurry into the gas conditioning tower.

According to the present invention, a clinker plant comprises a gas conditioning system comprising a preheater exit, a gas conditioning tower, and a main baghouse; a separator for separating dust from exhaust gases; and a nozzle for introducing the separated dust in proximity to the preheater exhaust exit, into the gas conditioning tower, in proximity to the inlet to the dust collector, or a combination of any of the foregoing.

In any of the preceding aspects, the clinker plant further comprises one or more separators for separating dust generated during the production of clinker into one or more dust fractions.

In any of the preceding aspects, the clinker plant further comprises a slaker for mixing the one or more dust fractions with water to provide a dust slurry; and a nozzle for introducing the dust slurry into the gas conditioning tower.

In any of the preceding aspects, the clinker plant further comprises a nozzle for introducing at least one of the one or more dust fractions into the gas conditioning system at one or more locations between the preheater exit and the main baghouse.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A method for reducing the concentration of controlled pollutants in clinker kiln emissions, comprising:
   providing a clinker kiln, wherein the clinker kiln comprises a gas conditioning system configured to process exhaust gases from the clinker kiln, wherein,
   the exhaust gases comprise controlled pollutants and entrained dust; and the gas conditioning system comprises:

a preheater exhaust exit;
a gas conditioning tower directly coupled to the preheater exhaust exit; and
an inlet to a dust filter directly coupled to the gas conditioning tower; and
introducing bypass dust generated during operation of the clinker kiln:
between the preheater exhaust exit and the gas conditioning tower;
into the gas conditioning tower;
between the gas conditioning tower and the inlet to the dust filter; \or
a combination of any of the foregoing,
thereby reducing the concentration of controlled pollutants in the clinker kiln emissions.

2. The method of claim 1, wherein the bypass dust comprises calcined dust and partially calcined dust.

3. The method of claim 1, wherein the controlled pollutants comprise controlled acidic pollutants.

4. The method of claim 1, wherein the bypass dust comprises total bypass dust.

5. The method of claim 1, wherein the bypass dust is characterized by a calcium oxide (CaO) content from 8 wt % to 80 wt %, wherein wt % is based on the total solids content of the bypass dust.

6. The method of claim 1, further comprising separating the bypass dust into coarse bypass dust and fine bypass dust, wherein introducing the bypass dust comprises: introducing the fine bypass dust into the gas conditioning system; introducing the coarse bypass dust into the gas conditioning system; or introducing both the fine bypass dust and the coarse bypass dust into the gas conditioning system.

7. The method of claim 6, wherein,
the coarse bypass dust is characterized by an average mean particle diameter greater than 100 μm; and
the fine bypass dust is characterized by an average mean particle diameter less than 100 μm.

8. The method of claim 6, wherein introducing the bypass dust comprises:
introducing the coarse bypass dust into the gas conditioning tower;
introducing the fine bypass dust into the gas conditioning tower; or
introducing both the coarse bypass dust and the fine bypass dust into the gas conditioning tower.

9. The method of claim 1, further comprising:
separating fine bypass dust from the bypass dust;
mixing the fine bypass dust with water to provide a fine bypass dust slurry; and
introducing the fine bypass dust slurry into the gas conditioning system.

10. The method of claim 1, wherein,
the clinker kiln comprises:
a precalciner;
a kiln; and
a kiln riser duct disposed between the precalciner and the kiln; and
the method further comprises extracting the bypass dust at the kiln riser duct.

11. The method of claim 1, wherein introducing the bypass dust comprises injecting the bypass dust into the gas conditioning tower at one or more locations.

12. The method of claim 1, wherein,
the gas conditioning tower comprises water injection nozzles; and
introducing the bypass dust comprises injecting the bypass dust into the gas conditioning tower above the water injection nozzles.

13. The method of claim 6, wherein introducing both the fine bypass dust fraction and the coarse bypass dust fraction into the gas conditioning system comprises: introducing the fine bypass dust fraction into the gas conditioning system at a first location; and introducing the coarse bypass dust fraction into the gas conditioning system at a second location.

14. The method of claim 1, further comprising: separating coarse bypass dust from the bypass dust; mixing the coarse bypass dust with water to provide a coarse bypass dust slurry; and introducing the coarse bypass dust slurry into the gas conditioning system.

* * * * *